(12) United States Patent
Chu et al.

(10) Patent No.: US 11,859,647 B2
(45) Date of Patent: Jan. 2, 2024

(54) FASTENER

(71) Applicant: Hilti Aktiengesellschaft, Schaan (LI)

(72) Inventors: Xiaolong Chu, Zhanjiang (CN); Cheng Lin, Zhanjiang (CN); Yixiang Liao, Zhanjiang (CN); Xiaojian Huang, Zhanjiang (CN); Man Liu, Irving, TX (US)

(73) Assignee: Hilti Aktiengesellschaft, Schaan (LI)

( * ) Notice: Subject to any disclaimer, the term of this patent is extended or adjusted under 35 U.S.C. 154(b) by 393 days.

(21) Appl. No.: 16/958,352

(22) PCT Filed: Dec. 3, 2018

(86) PCT No.: PCT/EP2018/083252
§ 371 (c)(1),
(2) Date: Jun. 26, 2020

(87) PCT Pub. No.: WO2019/129460
PCT Pub. Date: Jul. 4, 2019

(65) Prior Publication Data
US 2021/0062846 A1    Mar. 4, 2021

(30) Foreign Application Priority Data
Dec. 29, 2017   (CN) .......................... 201711466724.5

(51) Int. Cl.
*F16B 13/12*     (2006.01)
*F16B 13/06*     (2006.01)
(52) U.S. Cl.
CPC .......... *F16B 13/068* (2013.01); *F16B 13/126* (2013.01)

(58) Field of Classification Search
CPC .. F16B 19/1081; F16B 13/126; F16B 13/063; F16B 13/065; F16B 13/066
USPC .................................... 411/45–48, 57.1, 60.1
See application file for complete search history.

(56) References Cited

U.S. PATENT DOCUMENTS

| | | | | |
|---|---|---|---|---|
| 1,806,640 | A * | 5/1931 | Ogden .................. | F16B 13/126 411/65 |
| 2,292,467 | A * | 8/1942 | Norsell ............... | F16B 19/1081 29/523 |
| 3,523,482 | A * | 8/1970 | Ploch .................... | F16B 13/066 411/968 |
| 4,909,657 | A * | 3/1990 | Maechtle ................ | B25B 31/00 403/297 |

(Continued)

FOREIGN PATENT DOCUMENTS

| | | |
|---|---|---|
| CN | 2462129 Y | 11/2001 |
| CN | 102032252 A | 4/2011 |

(Continued)

OTHER PUBLICATIONS

PCT/EP2018/083252, International Search Report dated Mar. 1, 2019 (Two (2) pages).

*Primary Examiner* — Flemming Saether
(74) *Attorney, Agent, or Firm* — Crowell & Moring LLP

(57) ABSTRACT

A fastener includes a main body having a tubular portion and a split portion that extends from a lower end of the tubular portion, and longitudinally includes a tapered section that tapers in a direction towards the tubular portion. The fastener further includes an expansion sleeve annularly surrounding the split portion, wherein the expansion sleeve longitudinally extends to a lower end of the tapered section.

13 Claims, 4 Drawing Sheets

(56) References Cited

U.S. PATENT DOCUMENTS

| | | | |
|---|---|---|---|
| 4,917,552 A * | 4/1990 | Crawford | F16B 13/126 411/32 |
| 5,116,176 A * | 5/1992 | Yousuke | F16B 13/08 411/33 |
| 6,179,536 B1 * | 1/2001 | Belz | F16B 13/0858 411/60.1 |
| 6,293,743 B1 | 9/2001 | Ernst et al. | |
| 6,579,049 B2 * | 6/2003 | Kaibach | F16B 13/066 411/61 |
| 6,846,141 B2 * | 1/2005 | Heinzelmann | F16B 13/063 411/57.1 |
| 8,974,163 B2 | 3/2015 | Ricketts | |
| 9,933,002 B2 | 4/2018 | Gstach et al. | |
| 2010/0003101 A1 | 1/2010 | Ricketts | |
| 2011/0081217 A1 | 4/2011 | Wissling et al. | |

FOREIGN PATENT DOCUMENTS

| | | |
|---|---|---|
| CN | 102192224 A | 9/2011 |
| CN | 102364126 A | 2/2012 |
| CN | 105765240 A | 7/2016 |
| CN | 206206348 U | 5/2017 |
| DE | 30 06 480 A1 | 8/1981 |
| DE | 203 03 806 U1 | 8/2004 |
| JP | 10-338972 A | 12/1998 |
| JP | 2000-230279 A | 8/2000 |
| JP | 2006-16952 A | 1/2006 |
| KR | 10-2007-0077512 A | 7/2007 |
| TW | 201712193 A | 4/2017 |

\* cited by examiner

FASTENER

FIELD OF THE INVENTION

The present invention relates to a fastener and, more particularly, to a fastener having an expansion sleeve.

BACKGROUND OF THE INVENTION

Fasteners such as drop-in anchors are often used for hanging objects like pipes to a target structure, such as a wall or a ceiling. Compared to other anchors, drop-in anchors have advantages of ease of installation and providing a flat surface on the target structure after installation. A conventional drop-in anchor usually has a tubular body with a threaded hole formed in an upper part thereof. A lower part of the drop-in anchor is split into two or more segments annularly surrounding a longitudinal axis of the drop-in anchor. The drop-in anchor is set to the target structure by pressing it into a pre-formed hole in the target structure that has an inner diameter substantially same as an outer diameter of the tubular body, and inserting a plug from the threaded hole to the lower part to expand the segments outwardly in order to achieve a frictional engagement between outer surface of the segments and walls of the pre-formed hole. However, such conventional drop-in anchor cannot meet requirements for seismic conditions or concrete with cracks because the segments will not further expand outwardly after installation.

U.S. Pat. No. 8,974,163B2 discloses a hybrid drop-in anchor which is a simple combination of the conventional drop-in anchor and a conventional wedge anchor for meeting cracked concrete testing specifications. The hybrid drop-in anchor has an anchor body including a split base region, and an expansion sleeve that surrounds the split base region. The expansion sleeve has clip segments outwardly expansible by the split base region. However, as shown in U.S. Pat. No. 8,974,163B2, the expansion sleeve only surrounds a neck of constant diameter and an upper part of the tapered portion of the split base region, where has less radial expansion compared to the lower part of the tapered portion and the base end when a plug is set into the anchor. Therefore, projections need to be formed on an outer surface of the expansion sleeve to achieve a tight engagement between the expansion sleeve and walls of the hole. However, such projections standing radially outwardly from an outer surface of the expansion sleeve will damage the walls of the hole when the anchor is being hammered into the hole or when the expansion sleeve is expanded with the insertion of the plug.

In addition, when the anchor is installed, as the tapered portion is longitudinally partially covered by the expansion sleeve, the contact between the lower edge of the expansion sleeve and a side surface of the tapered portion, or the friction between the walls of the hole and the uncovered tapered portion of the anchor body, might hold up a backward sliding of the anchor body with respect to the expansion sleeve when the anchor is pulled outward due to cracks in target structure or seismic conditions. Thus, there are uncertainties to achieve a sustained outward expansion resulting from a smooth relative sliding between the anchor body and the expansion sleeve, which brings safety risks.

Accordingly, it would be advantageous to have an alternative fastener with an expansion sleeve.

SUMMARY OF THE INVENTION

In one embodiment, the present invention provides a fastener including a main body with a through hole longitudinally formed therein. The main body includes a tubular portion defining walls that surround an upper part of the through hole, and a split portion extending from a lower end of the tubular portion. The split portion longitudinally includes a tapered section that tapers in a direction towards the tubular portion. The fastener further includes an expansion sleeve annularly surrounding the split portion, wherein the expansion sleeve longitudinally extends to a lower end of the tapered section.

In another embodiment, the present invention provides a fastener including a main body with a through hole longitudinally formed therein. The main body includes a tubular portion defining walls that surround an upper part of the through hole, and a split portion extending from a lower end of the tubular portion, wherein the split portion longitudinally includes a tapered section that tapers in a direction towards the tubular portion. The fastener further includes an expansion sleeve annularly surrounding the split portion, wherein the expansion sleeve longitudinally extends to a lower end of the tapered section after a plug is set into a lower part of the through hole.

In yet another embodiment, the present invention provides a fastener including a main body with a through hole longitudinally formed therein. The main body includes a tubular portion defining walls that surround an upper part of the through hole, and a split portion extending from a lower end of the tubular portion, wherein the split portion longitudinally includes a tapered section that tapers in a direction towards the tubular portion, wherein the tapered section defines an external annular recess surrounding the split portion. The fastener further includes an expansion sleeve annularly surrounding the split portion and at least partially received in the recess, wherein the expansion sleeve longitudinally extends to or beyond a reference plane located between an upper end of the recess and a lower end of the tapered section and substantially perpendicular to a longitudinal axis of the main body, wherein a longitudinal distance between the reference plane and the lower end of the tapered section is equal to or less than 15% of a longitudinal distance between the upper end of the recess and the lower end of the tapered section.

BRIEF DESCRIPTION OF THE DRAWINGS

The invention, together with objects and advantages thereof, may best be understood by reference to the following description of preferred embodiments together with the accompanying drawings in which.

DETALED DESCRIPTION OF PREFERRED EMBODIMENTS

Figure 1:
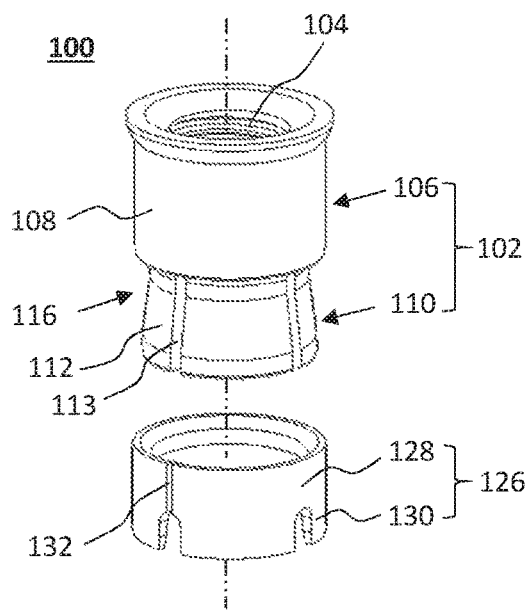
FIG. 1 is a schematic exploded, perspective view of a fastener having an expansion sleeve in accordance with an embodiment of the present invention.

The detailed description set forth below in connection with the appended drawings is intended as a description of presently preferred embodiments of the invention, and is not intended to represent the only forms in which the present invention may be practised. It is to be understood that the same or equivalent functions may be accomplished by different embodiments that are intended to be encompassed within the spirit and scope of the invention. In the drawings, like numerals are used to indicate like elements throughout. Furthermore, terms "comprises," "comprising," or any other variation thereof, are intended to cover a non-exclusive inclusion, such that module, circuit, device components, structures and method steps that comprises a list of elements or steps does not include only those elements but may include other elements or steps not expressly listed or inherent to such module, circuit, device components or steps. An element or step proceeded by "comprises . . . a" does not, without more constraints, preclude the existence of additional identical elements or steps that comprises the element or step.

Figure 2:
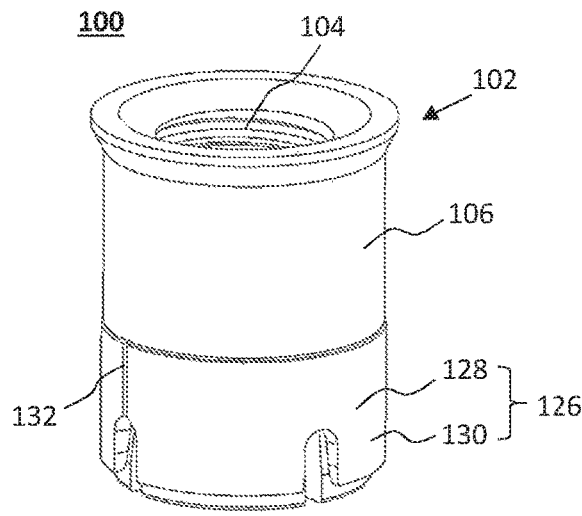
FIG. 2 is a schematic isometric view of the fastener of FIG. 1 after being assembled in accordance with an embodiment of the present invention.

Referring now to FIGS. 1 and 2, schematic exploded and assembled perspective views of a fastener 100 in accordance with an embodiment of the present invention are shown. The fastener 100 comprises a main body 102 with a through hole 104 longitudinally formed therein. The main body 102 includes a tubular portion 106 defining walls 108 that surround an upper part of the through hole 104, and a split portion 110 extending from a lower end of the tubular portion 106 with a free distal end facing away from the tubular portion 106. In a preferred embodiment, the split portion 110 comprises at least two expansible members 112 annularly surrounding a lower part of the through hole 104. In a preferred embodiment, the expansible members 112 integrally extend from lower ends of the walls 108. In a preferred embodiment, two adjacent expansible members 112 are spaced by a gap 113.

Figure 3:
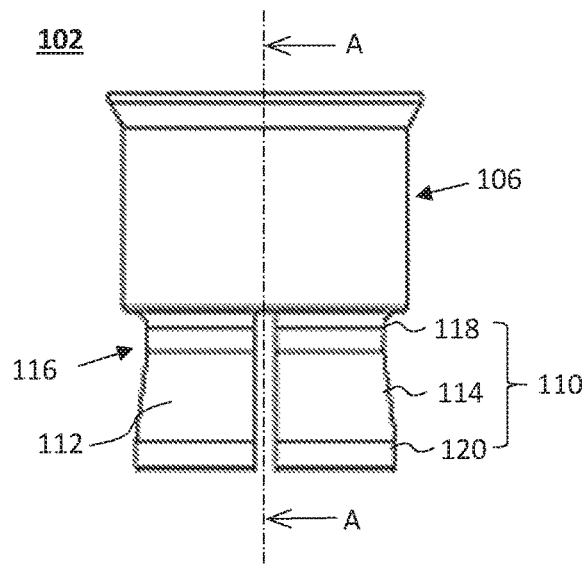
FIG. 3 is a schematic front view of a main body of the fastener of FIG. 1 in accordance with an embodiment of the present invention.
Figure 4:
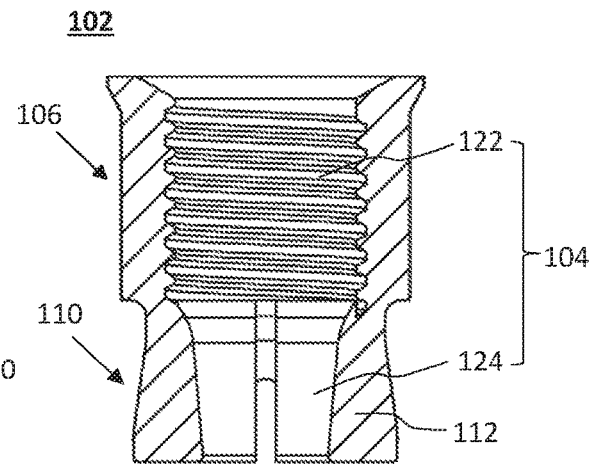
FIG. 4 is a schematic cross-sectional side view of the main body of FIG. 3 from line A-A in accordance with an embodiment of the present invention.

FIG. 3 is a schematic front view of a main body 102 of the fastener of FIG. 1 in accordance with an embodiment of the present invention, and FIG. 4 is a schematic cross-sectional side view of the main body 102 of FIG. 3 from line A-A. In a preferred embodiment, the split portion 110 longitudinally comprises a tapered section 114 that tapers in a direction towards the tubular portion 106. The tapered section 114 is preferably truncated-conical shaped. In a preferred embodiment, the tapered section defines an external annular recess 116 surrounding the split portion 108. In a preferred embodiment, an outer diameter of an upper end of the tapered section 114 is less than an outer diameter of the lower end of the tubular portion 106, which forms the external annular recess 116. In a preferred embodiment, an outer diameter of the lower end of the tapered section 114 is equal to or less than an outer diameter of the tubular portion 106. In a preferred embodiment, the gap 113 longitudinally extends from the upper end of the tapered section 114 to the free distal end of the split portion 110.

In a preferred embodiment, the split portion 110 also comprises a neck section 118 located between the tubular portion 106 and the tapered section 114, wherein a minimum outer diameter of the neck section 118 is less than the outer diameter of the lower end of the tubular portion 106. In a preferred embodiment, a height of the neck section 118 is less than a height of the tapered section 114. In a preferred embodiment, the height of the neck section 118 is $\frac{1}{8}$-$\frac{1}{3}$ of the height of the tapered section 114. In a preferred embodiment, the tubular portion 106, the neck section 118 and the tapered section 114 are co-axial and integrally formed. In another preferred embodiment, the tapered section 114 directly integrally extends from the lower end of the tubular portion 106.

In a preferred embodiment, the split portion 110 further comprises a base section 120 extending from the lower end of the tapered section 114 with an outer diameter of an upper end thereof equal to the outer diameter of the lower end of the tapered section 114. In a preferred embodiment, the base section 120 is substantially cylindrical-shaped. In another preferred embodiment, the base section 120 tapers in a direction towards the tapered section 114 with a taper less than a taper of the tapered section 114. In a preferred embodiment, the base section 120 and the tapered section 114 are co-axial and integrally formed. In a preferred embodiment, a height of the base section 120 is $\frac{1}{6}$-$\frac{1}{3}$ of a height of the tapered section 114.

As shown in FIG. 4, the upper part 122 of the through hole 104 is threaded for engaging a threaded male member, such as a bolt, or a threaded rod. In a preferred embodiment, the lower part 124 of the through hole 104 tapers in a direction away from the upper part 122 of the through hole 104 such that the expansible members 112 expand outwardly when a plug is inserted from the upper part 122 into the lower part 124 of the through hole. In a preferred embodiment, the main body 102 is integrally formed from a raw metal material by cold forming or machining.

Referring back to FIGS. 1 and 2, the fastener 100 further comprises an expansion sleeve 126 disposed annularly about the split portion 110 and at least partially received in the external annular recess 116. The expansion sleeve 126 comprises a ring portion 128 annularly surrounding the split portion 110, and a plurality of expansion segments 130 disposed along and integrally extending from the ring portion 128 towards the free distal end of the split portion 110. In a preferred embodiment, the ring portion 128 is C-shaped and annularly surrounds the split portion 110.

Figure 5:
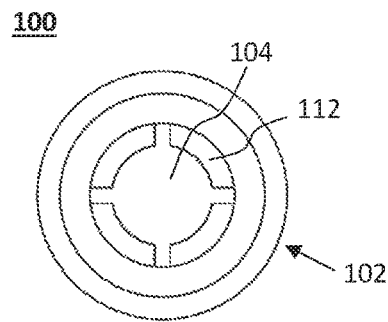
FIGS. 5 and 6 are respective top and bottom plan views of the fastener of FIG. 1 in accordance with an embodiment of the present invention.
Figure 6:
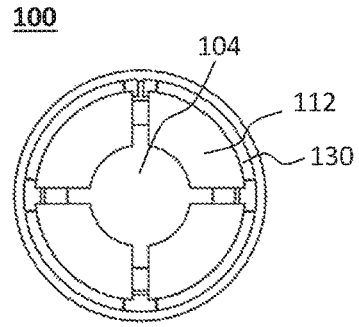

FIGS. 5 and 6 are respective top and bottom plan views of the fastener of FIG. 1 in accordance with an embodiment of the present invention. In a preferred embodiment, the split portion 110 comprises four expansible members 112 substantially evenly distribute around the through hole 104. In a preferred embodiment, the expansion sleeve 126 comprises four expansible segments 130 substantially evenly distribute around the through hole 104. However, the number of the expansible members 112 or the expansible segments 130 is not limited to four, and the numbers of the expansible members 112 and the expansible segments 130 are not necessarily to be identical.

Figure 7:
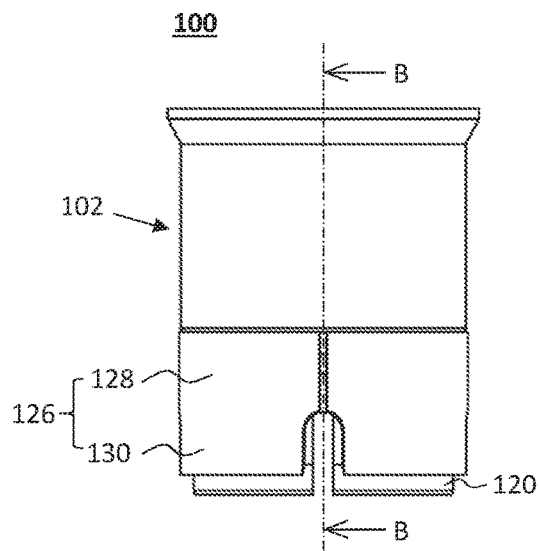
FIG. 7 is a schematic front view of the fastener of FIG. 1 in accordance with an embodiment of the present invention
Figure 8:
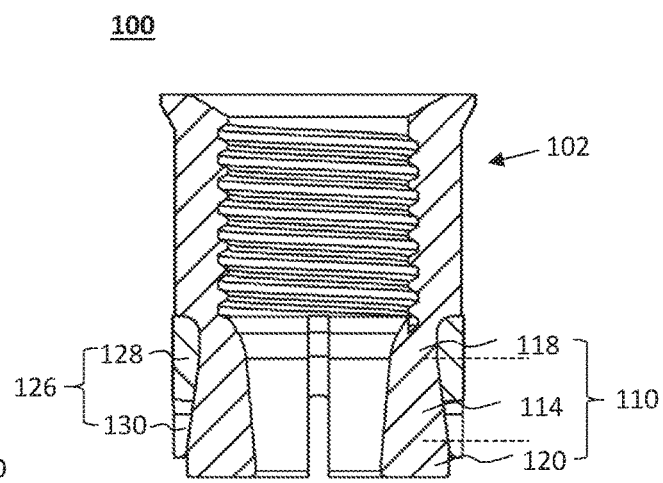
FIG. 8 is a schematic cross-sectional side view of the fastener of FIG. 7 from line B-B in accordance with an embodiment of the present invention.

FIG. 7 is a schematic front view of the fastener of FIG. 1 in accordance with an embodiment of the present invention, and FIG. 8 is a schematic cross-sectional side view of the fastener of FIG. 7 from line B-B in accordance with an embodiment of the present invention. In a preferred embodiment, the expansion sleeve 126 longitudinally extends from the lower end of the tubular portion 106 to the lower end of the tapered section 114, for example, the expansion sleeve 126 longitudinally extends across the tapered section 114. In another preferred embodiment, the expansible segments 130 longitudinally extend beyond the lower end of the tapered section 114 and annularly surround the base section 120 of the split portion 110. In a preferred embodiment, the expansion sleeve 126 longitudinally covers no less than ⅓ of the height of the base section 120. In yet another preferred embodiment, the expansible segments 130 longitudinally extends to a lower end of the base section 120.

In a preferred embodiment, the expansion sleeve 126 is substantially cylindrical shaped. In a preferred embodiment, an outer diameter of the expansion sleeve 126 is no less than the outer diameter of the tubular portion 106. In a preferred embodiment, a radial thickness of the expansion sleeve 126 gradually gets thinner from the ring portion 128 to free distal ends of the expansible segments 130, and an inner surface of the expansion sleeve 126 inclines and mates with a side surface of the tapered section 114.

Figure 9:
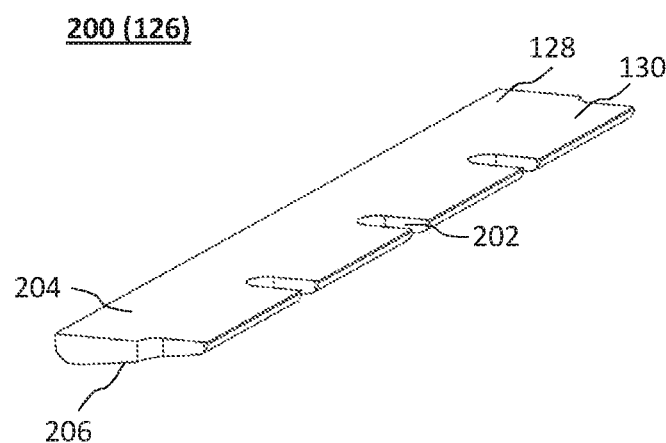
FIG. 9 is a schematic isometric view of a partially-formed expansion sleeve in accordance with an embodiment of the present invention.

With reference to FIG. 9, a schematic isometric view of a partially-formed expansion sleeve 126 in accordance with an embodiment of the present invention is shown. In a preferred embodiment, the expansion sleeve 126 is formed by rolling a stamped metal strip 200 around the split portion 110 of the main body 102. The metal strip 200 is cut off from a metal sheet material preferably by stamping or punching, wherein notches 202 with an inverted "U" shape or inverted "V" shape are formed along a side of the metal strip 200 by punching or cutting to form the expansible segments 130. In a preferred embodiment, an upper surface 204 of the metal strip 200 is substantially flat, while an opposite lower surface 206 of the metal strip 200 is inclined with respect to the upper surface 204, such that a thickness of the metal strip 200 gradually gets thinner from the ring portion 128 to the free distal ends of the expansible segments 130. After rolling the metal strip 200 around the split portion 110 to form the expansion sleeve 126, the expansion sleeve 126 is at least partially received in the external annular recess 116, and an inner surface of the expansion sleeve 126, i.e. the lower surface 206 of the metal strip 200, mates with the side surface of the tapered section 114.

Referring back to FIGS. 1 and 2, in another preferred embodiment, the expansion sleeve 126 can also be formed by machining. A slit 132 is formed for clamping the expansion sleeve 126 to the split portion 110.

Figure 10:
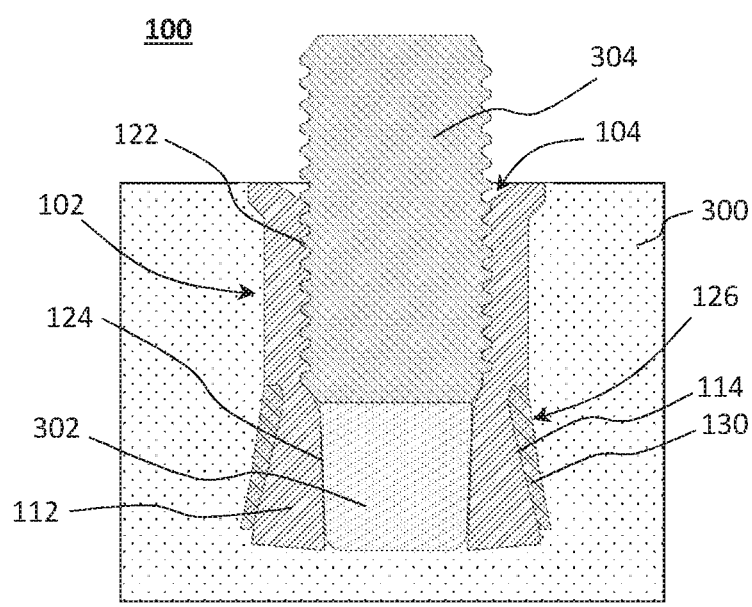
FIG. 10 is a schematic cross-sectional side view of the fastener of FIG. 1 that is installed into a hole of a target structure in accordance with an embodiment of the present invention.

FIG. 10 is a schematic cross-sectional side view of the fastener 100 of FIG. 1 that is installed into a hole of a target structure 300 in accordance with an embodiment of the present invention. The expansion segments 130 of the expansion sleeve 126 are expanded outwardly by the expansible members 112 when a plug 302 is inserted into the lower part 124 of the through hole 104. A bolt 304 is threaded into the upper part 122 of the through hole 104 for hanging objects to the target structure 300. As shown in FIG. 10, the expansion segments 130 longitudinally extend to the lower end of the tapered section 114, where a greater expansion force is generated, which achieves a tight engagement between the expansion sleeve 126 and the target structure 300.

In addition, since the entire tapered section 114 is longitudinally covered by the expansion sleeve 126, when the fastener 100 is pulled outward, the tapered section 114 will not be stopped by the lower edge of the expansion sleeve 126 and there is no significant friction between the main body 102 and walls of the hole. The smooth relative sliding between the main body 102 and the expansion sleeve 126 results in a sustained expansion of the expansion sleeve 126, which ensures a reliable locking engagement between the fastener 100 and the target structure 300 when there are cracks in the target structure 300 or under seismic conditions.

Figure 11:
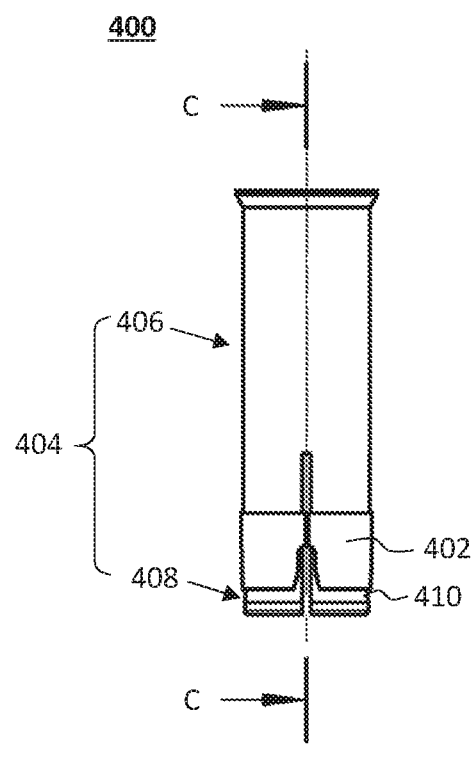
FIG. 11 is a schematic front view of a fastener having an expansion sleeve in accordance with another embodiment of the present invention.

Referring to FIG. 11, a schematic front view of a fastener 400 having an expansion sleeve 402 in accordance with another embodiment of the present invention is shown. Similar to the fastener 100 of FIG. 1, the fastener 400 includes a main body 404 having a tubular portion 406 and a split portion 408, wherein the split portion 408 longitudinally includes a tapered section 410 that tapers in a direction towards the tubular portion 406.

Figure 12:
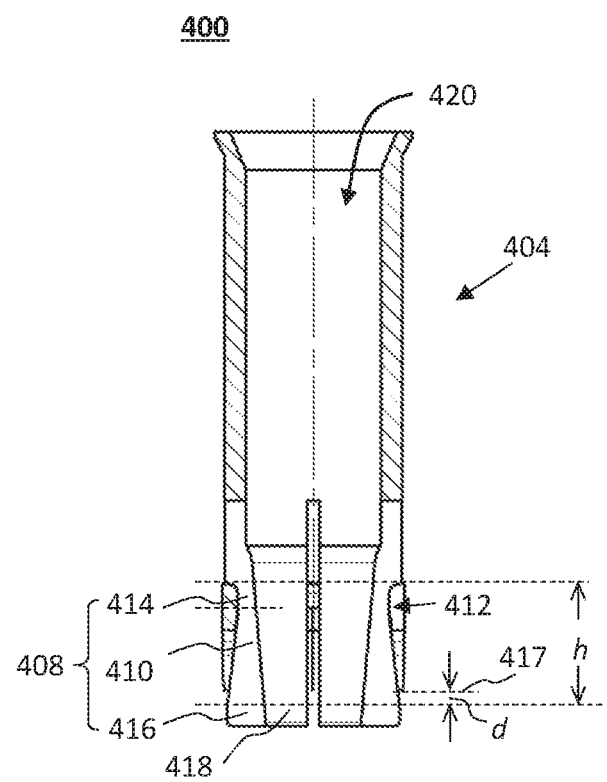
FIG. 12 is a schematic cross-sectional side view of the fastener of FIG. 11 from line C-C in accordance with an embodiment of the present invention.

FIG. 12 is a schematic cross-sectional side view of the fastener of FIG. 11 from line C-C in accordance with an embodiment of the present invention. The tapered section 410 defines an external annular recess 412 surrounding the split portion 408, wherein the expansion sleeve 402 annularly surrounds the split portion 408 and is at least partially received in the recess 412. Similar to the fastener 100 of FIG. 1, in a preferred embodiment, the split portion 408 further includes a neck section 414 between the tubular portion 406 and the tapered section 410, and a base section 416 extending from a lower end of the tapered section 410. In a preferred embodiment, there is a longitudinal distance d between a lower end of the expansion sleeve 402 and the lower end of the tapered section 410 of the split portion 408. In a preferred embodiment, the longitudinal distance d between the lower end of the expansion sleeve 402 and the lower end of the tapered section 410 is equal to or less than 15% of a longitudinal distance h between an upper end of the recess 412 and the lower end of the tapered section 410. In another preferred embodiment, the longitudinal distance d between the lower end of the expansion sleeve 402 and the lower end of the tapered section 410 is equal to or less than 10% of the longitudinal distance h between the upper end of the recess 412 and the lower end of the tapered section 410.

In a preferred embodiment, the expansion sleeve 402 downwardly extends to or beyond a reference plane 417 located between the upper end of the recess 412 and the lower end of the tapered section 410, and substantially perpendicular to a longitudinal axis of the main body 404, wherein a longitudinal distance between the reference plane 417 and the lower end of the tapered section 410 is equal to or less than 15% of the longitudinal distance h between the upper end of the recess 412 and the lower end of the tapered section 410. In a preferred embodiment, the longitudinal distance between the reference plane 417 and the lower end of the tapered section 410 is equal to or less than 10% of the longitudinal distance h between the upper end of the recess 412 and the lower end of the tapered section 410, such that the lower end of the expansion sleeve 402 substantially longitudinally extends to or beyond the lower end of the tapered section 410 after a plug is set into a lower part 418 of a longitudinal hole 420 of the fastener 400.

The description of the preferred embodiments of the present invention has been presented for purposes of illustration and description, but is not intended to be exhaustive or to limit the invention to the forms disclosed. It will be appreciated by those skilled in the art that changes could be made to the embodiments described above without departing from the broad inventive concept thereof. It is understood, therefore, that this invention is not limited to the particular embodiment disclosed, but covers modifications within the spirit and scope of the present invention as defined by the appended claims.

The invention claimed is:

1. A fastener, comprising:
a main body with a through hole longitudinally formed therein, wherein the main body comprises:
a tubular portion that defines walls surrounding an upper part of the through hole; and
a split portion that extends from a lower end of the tubular portion, wherein the split portion longitudinally comprises a tapered section that tapers with a first taper in a direction towards the tubular portion and away from a base section that (a) tapers towards the tapered section with a second taper that is less than the first taper and (b) is located at a terminal distal end of the split portion opposite the tubular portion; and
an expansion sleeve annularly surrounding the split portion, wherein the expansion sleeve longitudinally extends at least to a lower end of the tapered section.

2. The fastener of claim 1, wherein the tapered section defines an external annular recess surrounding the split portion and wherein the expansion sleeve is at least partially received in the external annular recess.

3. The fastener of claim 1, wherein the expansion sleeve comprises a ring portion annularly surrounding the main body and a plurality of expansion segments disposed along and extending from the ring portion towards the lower end of the tapered section, wherein the split portion comprises at least two expansible members annularly surrounding a lower part of the through hole and wherein the expansion segments are outwardly expansible by expansion of the expansible members.

4. The fastener of claim 1, wherein an outer diameter of an upper end of the tapered section is less than an outer diameter of the lower end of the tubular portion.

5. The fastener of claim 4, wherein the split portion further comprises a neck section located between the tubular portion and the tapered section and wherein a minimum outer diameter of the neck section is less than the outer diameter of the lower end of the tubular portion.

6. The fastener of claim 1, wherein an outer surface of the expansion sleeve does not include friction enhancing projections.

7. The fastener of claim 1, wherein the expansion sleeve longitudinally extends beyond the lower end of the tapered section and annularly surrounds the base section.

8. The fastener of claim 7, wherein the expansion sleeve longitudinally extends only to a lower end of the base section.

9. The fastener of claim 1, wherein the expansion sleeve is cylindrical shaped and an inner surface of the expansion sleeve is inclined inwardly and mates with a side surface of the tapered section.

10. The fastener of claim 1, wherein the expansion sleeve comprises a longitudinal slit.

11. The fastener of claim 1, wherein the expansion sleeve is formed by rolling a stamped metal strip around the split portion.

12. A fastener, comprising:
a main body with a through hole longitudinally formed therein, wherein the main body comprises:
a tubular portion that defines walls surrounding an upper part of the through hole; and
a split portion that extends from a lower end of the tubular portion, wherein the split portion longitudinally comprises a tapered section that tapers with a first taper in a direction towards the tubular portion and away from a base section that (a) tapers towards the tapered section with a second taper that is less than the first taper and (b) is located at a terminal distal end of the split portion opposite the tubular portion; and
an expansion sleeve annularly surrounding the split portion, wherein the expansion sleeve longitudinally extends at least to a lower end of the tapered section after a plug is set into a lower part of the through hole.

13. A fastener, comprising:
a main body with a through hole longitudinally formed therein, wherein the main body comprises:
a tubular portion that defines walls surrounding an upper part of the through hole; and
a split portion that extends from a lower end of the tubular portion, wherein the split portion longitudinally comprises a tapered section that tapers with a first taper in a direction towards the tubular portion and away from a base section that (a) tapers towards the tapered section with a second taper that is less than the first taper and (b) is located at a terminal distal end of the split portion opposite the tubular portion, and wherein the tapered section defines an external annular recess surrounding the split portion; and
an expansion sleeve annularly surrounding the split portion and at least partially received in the recess, wherein the expansion sleeve longitudinally extends to or beyond a reference plane located between an upper end of the recess and a lower end of the tapered section and substantially perpendicular to a longitudinal axis of the main body and wherein a longitudinal distance between the reference plane and the lower end of the tapered section is equal to or less than 15% of a longitudinal distance between the upper end of the recess and the lower end of the tapered section.

* * * * *